United States Patent

Friederichs et al.

(10) Patent No.: US 11,352,386 B2
(45) Date of Patent: Jun. 7, 2022

(54) DIHYDROCARBYL-SILYL-BRIDGED-SUBSTITUTED CYCLOPENTADIENYL METALLOCENE COMPLEXES FOR OLEFIN POLYMERIZATION

(71) Applicant: SABIC GLOBAL TECHNOLOGIES B.V., Bergen op Zoom (NL)

(72) Inventors: Nicolaas Hendrika Friederichs, Geleen (NL); Antonio Vittoria, Geleen (NL); Roberta Cipullo, Geleen (NL); Vincenzo Busico, Geleen (NL); Ilya Borisov, Geleen (NL); Bogdan A. Guzeev, Geleen (NL); Dmitry Y. Mladentsev, Geleen (NL); Mikhail I. Sharikov, Geleen (NL); Dmitry Uborsky, Geleen (NL); Alexander Voskoboynikov, Geleen (NL); Hendriksen Coen, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 118 days.

(21) Appl. No.: 16/500,663

(22) PCT Filed: Apr. 4, 2018

(86) PCT No.: PCT/EP2018/058630
§ 371 (c)(1),
(2) Date: Oct. 3, 2019

(87) PCT Pub. No.: WO2018/185176
PCT Pub. Date: Oct. 11, 2018

(65) Prior Publication Data
US 2020/0199165 A1    Jun. 25, 2020

(30) Foreign Application Priority Data

Apr. 4, 2017    (EP) .................................... 17164680
May 17, 2017    (EP) .................................... 17171567

(51) Int. Cl.
*C07F 17/00*    (2006.01)
*C08F 210/16*    (2006.01)
*C08F 4/6592*    (2006.01)

(52) U.S. Cl.
CPC .......... *C07F 17/00* (2013.01); *C08F 4/65927* (2013.01); *C08F 210/16* (2013.01)

(58) Field of Classification Search
CPC ..... C07F 17/00; C08F 4/65927; C08F 210/16
See application file for complete search history.

(56) References Cited

U.S. PATENT DOCUMENTS 5,071,808 A     12/1991   Antberg et al.
2015/0119539 A1  4/2015   McCullough
2019/0263942 A1* 8/2019   Jeong ................ C08F 4/65927

FOREIGN PATENT DOCUMENTS

| JP | 2008050278 A | 3/2008 |
| JP | 2012116871 A | 6/2012 |
| JP | 2014070029 A | 4/2014 |
| WO | 9411406 A1 | 5/1994 |
| WO | 2014099307 A1 | 6/2014 |
| WO | 2015065681 A1 | 5/2015 |
| WO | 20160168479 A1 | 10/2016 |
| WO | 20160195423 A1 | 12/2016 |
| WO | 2017026605 A1 | 2/2017 |
| WO | WO-2017188602 A1 * | 11/2017 .......... C08F 4/65925 |

OTHER PUBLICATIONS

International Search Report and Written Opinion of International Application No. PCT/EP2018/058630, International Filing Date Apr. 4, 2018, dated May 17, 2019, 14 pages.
Lewkebandara, et al., Adducts of titanium tetrachloride with organosulfur compounds. Crystal and molecular structures of TiCl4(C4H8S)2 and (TiCl4)2(CH3SSCH3), Polyhedron, 1998, vol. 17, No. 1, pp. 1-9.
Peacock Andrew J., "Handbook of Polyethylene", Chapter 3 Production Processes, 2000, Marcel Dekker, Inc., New York; ISBN 0824795466; p. 43-66.

(Continued)

*Primary Examiner* — Caixia Lu
(74) *Attorney, Agent, or Firm* — Cantor Colburn LLP

(57) ABSTRACT

The invention relates to a metallocene complex according to formula (I), wherein R1 is selected from C2-C10 alkyl, preferably C3-C10 alkyl, C6-C20 aryl, C7-C20 aralkyl groups, wherein R2 is selected from H, C1-C10 alkyl, and wherein R3, R4, R5 and R6 are independently selected from H, C1-C10 alkyl, C6-C20 aryl, or C7-C20 aralkyl groups and wherein R3 and R4, R4 and R5, or R5 and R6 can be connected to form a ring structure wherein M is selected from Ti, Zr and Hf, X is an anionic ligand to M. The invention also relates to a catalyst comprising the reaction product of the metallocene complex and a cocatalyst. Further the invention relates to a (co)polymerization process of olefinic monomers.

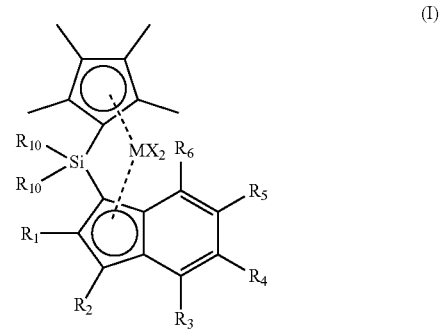

15 Claims, No Drawings

(56) References Cited

OTHER PUBLICATIONS

Randall et al. "A Review of High Resolution Liquid Carbon Nuclear Magnetic Resonance Characterizations of Ethylene-Based Polymers", Journal of Macromolecular Science—Reviews in Macromolecular Chem & Phys, C29 vol. 2 & 3, 1989, 16 pages.
Rudin, "Practical Aspects of Molecular Weight Measurements" Modern Methods of Polymer Characterization, John Wiley & Sons, New York (1991) pp. 103-112.
Sassmannshausen, Chemistry of Half-Sandwich Compounds of Zirconium: Evidence for the Formation of the Novel ansa Cationic-Zwitterionic Complex [Zr(n:n-C5H4CMe2C6H4Me-p)(u-MeB(CbF5)3)]+[MeB(C6F5)3], Organometallics, 2000, vol. 19, pp. 482-489.
Seenivasan, et al., "Spectroscopic Investigation of Heterogeneous Ziegler-Natta Catalysts: Ti and Mg Chloride Tetrahydrofuranates, Their Interaction Compound, and the Role of the Activator", Chemistry—a European Journal, 2011, vol. 17, pp. 8648-8656.
Waymouth et al., "Investigation of Bridge and 2-Phenyl Substituent Effects on Ethylene/ a-Olefin Copolymerizaton Behavior with 1,2'-Bridged Bis(indenyl)zirconium Dichlorides", Macromolecules 2004, 37, 2342-2347.
Zimm et al.; "The Dimensions of Chain Molecules Containing Branches and Rings"; J. Chem. Phys. 17; 1949; pp. 1301-1314.

\* cited by examiner

DIHYDROCARBYL-SILYL-BRIDGED-SUBSTITUTED CYCLOPENTADIENYL METALLOCENE COMPLEXES FOR OLEFIN POLYMERIZATION

CROSS REFERENCE TO RELATED APPLICATIONS

This application is a National Stage application of PCT/EP2018/058630, filed Apr. 4, 2018, which claims the benefit of European Application No. 17171567.5, filed May 17, 2017 and European Application No. 17164680.5, filed Apr. 4, 2017, all of which are incorporated by reference in their entirety herein.

The invention relates to substituted cyclopentadienyl metallocene complexes, a catalyst comprising a substituted cyclopentadienyl metallocene complex, a process for the preparation of olefin polymers in the presence of substituted cyclopentadienyl metallocene complexes, the use of the olefin polymers for making articles and articles comprising an olefin polymer.

Metallocene complexes together with a cocatalyst form catalysts that are widely used for olefin polymerization. In general, the metallocene complexes are known to have only one active polymerization center and are often referred to as single site catalysts or discrete catalysts to distinguish them from non-single site catalysts like for instance Ziegler-type catalysts. The presence of one active center is believed to result in polymers having a narrow molecular weight distribution (MWD) and narrow compositional distribution for copolymers of different olefins. An advantage of metallocene catalysts is their high activity and well defined structures compared to traditional Ziegler-Natta catalysts.

Numerous patent application are known describing metallocene catalysts. For example, WO2014/099307 describes metallocene catalysts for the polymerization of ethylene to branched polyethylene using a catalyst containing the metallocene system dimethylsilylene(2,3,4,5-tetramethyl-1-cyclopentadienyl)(3-phenyl-1-indenyl)zirconium dichloride.

EP0372414 discloses a metallocene catalyst with an ethylene bridged 1-indenyl 2-indenyl zirconium complex.

WO94/11406 discloses 2-indenyl complexes for olefin polymerization.

WO2015/065681 describes a 1-indenyl bridged catalyst system.

Macromolecules 2004, 37, 2342-2347 (Reybuck and Waymouth) describes an investigation of bridge and 2-phenyl substituent effects on ethylene-alfa olefin copolymerization behavior with 1,2'-bridged bis (indenyl) zirconium complexes.

Despite all efforts, there is a need for a highly active catalyst, which is able to produce polyolefins in a high yield, having a high reactivity for alfa olefin incorporation (like for example copolymerization of ethylene with 1-hexene) and which is still giving high molecular weight polymers.

International Application Nr. PCT/EP2018/058630; SABIC Global Technologies B.V. 17POLY0043-WO Corrected Page 20

(8.00 mmol, 2.5 M) of n-butyllithium, and 0.95 g (4.00 mmol) of $ZrCl_4$ after additional recrystallization from toluene. $^1$H NMR (400 MHz, $CDCl_3$): δ 7.60-7.66 (m, 2H), 7.28-7.33 (m, 2H), 5.94 (s, 2H), 2.04 (s, 6H), 1.99 (s, 6H), 0.91 (s, 6H).

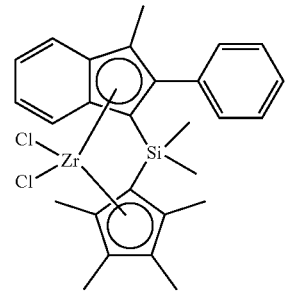

Cat 152

According to the General procedure 3, 1.53 g (27%) of the title compound (yellow crystals) were obtained from 4.10 g (10.0 mmol) of L152 in 150 ml of ether, 8.70 ml (20.0 mmol, 2.5 M) of n-butyllithium, and 2.50 g (10.0 mmol) of $ZrCl_4$ after additional recrystallization from toluene. $^1$H NMR (400 MHz, $CDCl_3$): δ 7.66 (d, 1H, J=8.8 Hz), 7.56 (d, 1H, J=8.8 Hz), 7.19-7.39 (m, 6H), 6.98-7.01 (m, 1H), 2.37 (s, 3H), 2.01 (s, 3H), 1.93 (s, 3H), 1.92 (s, 3H), 1.34 (s, 3H), 1.23 (s, 3H), 0.50 (s, 3H).

Polymerizations

The reactivity of a catalyst towards the comonomer 1-hexene is expressed as the mol percentage of hexene incorporated in the copolymer per volume percentage of hexene loading in the reactor-cells of the PPR. A high ratio of incorporated hexene:loaded hexene indicates a high reactivity of the catalyst towards comonomer, which is advantageous for commercial applications and also indicates that this catalyst is more prone to generate long-chain-branched polymers through re-insertion of vinyl terminated polymer chains. The value presented is the averaged value from the experiments with different hexene loadings to the reactor.

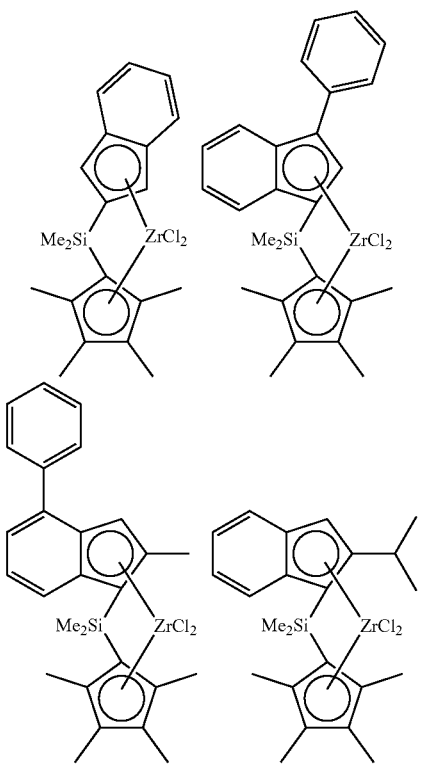

-continued

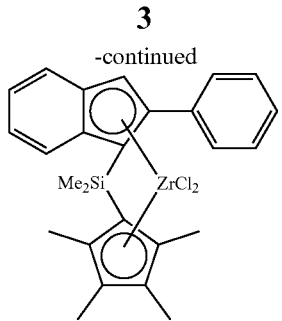

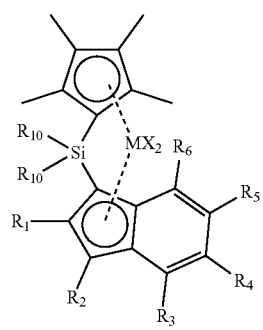

(I)

wherein R1 is selected from C2-C10 alkyl, preferably C3-C10 alkyl, C6-C20 aryl, C7-C20 aralkyl groups, wherein R2 is selected from H, C1-C10 alkyl, and wherein R3, R4, R5 and R6 are independently selected from H, C1-C10 alkyl, C6-C20 aryl, or C7-C20 aralkyl groups and wherein R3 and R4, R4 and R5, or R5 and R6 can be connected to form a ring structure;

wherein M is selected from Ti, Zr and Hf, X is an anionic ligand to M.

Examples of preferred C1-C10 alkyl groups are methyl, ethyl, n-propyl, iso-propyl, n-butyl, t-butyl, cyclohexyl.

Examples of preferred C7-C20 aralkyl groups are substituted or unsubstituted benzyl groups, more preferably benzyl groups.

Examples of preferred C6-C20 aryl groups are substituted or unsubstituted phenyl and, naphthyl groups, preferably phenyl groups, or 3,5-dimethyl-1-phenyl, 3,5-diethyl-1-phenyl,3,5-diisopropyl-1-phenyl or 3,5-ditertiairbutyl-1-phenyl.

For example, R3 may be selected from H, C1-C10 alkyl, C6-C20 aryl, or C7-C20 aralkyl groups, preferably from H or C1-C10 alkyl groups.

In a particular embodiment, the invention relates to a metallocene complex according to formula I,

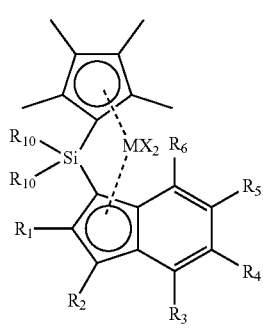

(I)

wherein R1 is selected from C2-C10 alkyl, preferably C3-C10 alkyl, C6-C20 aryl, C7-C20 aralkyl groups, wherein R2 is selected from H, C1-C10 alkyl, and wherein R3, R4, R5 and R6 are independently selected from H, C1-C10 alkyl, C6-C20 aryl, or C7-C20 aralkyl groups and wherein R3 and R4, R4 and R5, or R5 and R6 can be connected to form a ring structure, wherein each R10 is a hydrocarbyl group, preferably a C1-04 alkyl group, wherein M is selected from Ti, Zr and Hf, X is an anionic ligand to M.

Preferably M is zirconium or hafnium, most preferably M is zirconium.

Preferably M is connected to 2 monovalent anionic groups, selected from the group consisting of halogen (F, Cl, Br or I), a C1-C20 hydrocarbyl group or a C1-C20 alkoxy group. Preferably X is a methyl group, Cl, Br or I, most preferably methyl or Cl.

The metallocene complex according to formula (I) comprises a (2,3,4,5-tetramethyl-1-cyclopentadienyl) group which is bridged through a dihydrocarbyl-silyl bridge to a 1-indenyl group, which 1-indenyl group is substituted with one or more substituents. The hydrocarbyl group R10 preferably is a C1-C4 alkyl group, most preferably a methyl group.

In a preferred embodiment R1 is selected from isopropyl, phenyl, 3,5-dialkyl-1-phenyl, preferably 3,5-dimethyl-1-phenyl, 3,5-diethyl-1-phenyl,3,5-diisopropyl-1-phenyl or 3,5-ditertiairbutyl-1-phenyl. For example, R1 may be isopropyl or phenyl. For example, R1 may be isopropyl. For example, R1 may be phenyl.

In one preferred embodiment of the present invention, it has been found that metallocene complexes (II) show unexpected high activity for hexene, resulting in high hexene incorporation, while also the molecular weight of the polymers obtained is very high.

The metallocene complexes (II) have structures according to formula (II):

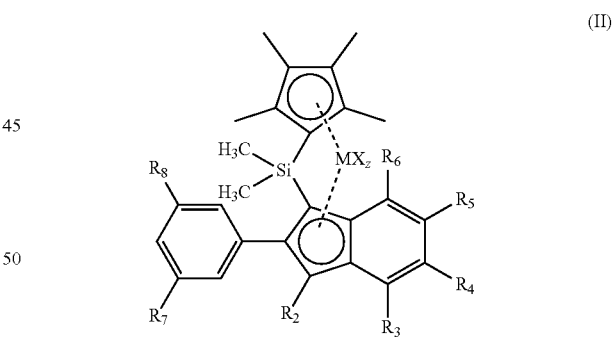

(II)

Preferably R2 is selected from H and C1-C10 alkyl groups, and R3, R4, R5 and R6 are independently selected from H, C1-C10 alkyl, and C6-C20 aryl, and wherein R3 and R4, R4 and R5, or R5 and R6 can be connected to form a ring structure. R7 and R8 preferably are selected from H and C1-C10 alkyl groups. Most preferably R7 and R8 are chosen from H, methyl, ethyl, propyl, isopropyl or tertiair butyl groups. Most preferably, R2-R6 are H.

Z is the number of X groups and equals the valence of M minus 2.

In another preferred embodiment of the invention the metallocene is according to formula (III)

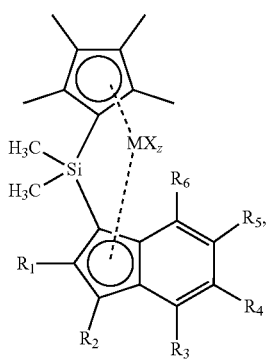

wherein R1 is isopropyl, R2 is H, R3-R6 are chosen from H, a methyl group, a phenyl group and/or R3 and R4 form a six membered ring structure. Preferably R3-R6 are H.

Support

The metallocene complex can be immobilized on a support. The support is preferably an inert support, more preferably a porous inert support. Examples of porous inert supports materials are talc, clay and inorganic oxides. Preferably, the support material is in a finely divided form.

Suitable inorganic oxide materials include group 2A, 3A, 4A and 4B metal oxides such as silica, alumina and mixtures thereof. Other inorganic oxides that may be employed either alone or in combination with the silica or alumina are magnesia, titania, zirconia and the like. Other support materials, however, can be employed, for example finely divided functionalized polyolefins such as finely divided polyethylene.

Preferably, the support is a silica having a surface area between 200 and 900 m²/g and a pore volume between 0.5 and 4 ml/g.

Catalyst

The invention is also directed to a catalyst prepared from the metallocene complex according to the invention and a cocatalyst. The cocatalyst should be capable to generate a cationic specie from the metallocene compound and form a so-called non- or weakly coordinating anion. Suitable cocatalysts include aluminium- or boron-containing cocatalysts. Suitable aluminium-containing cocatalysts comprise aluminoxanes, alkyl aluminium compounds and aluminium-alkyl-chlorides. The aluminoxanes usable according to the present invention are well known and preferably comprise oligomeric linear and/or cyclic alkyl aluminoxanes represented by the formula: $R^3$—$(AlR^3$—$O)_n$—$AlR^3{}_2$ for oligomeric, linear aluminoxanes and $(-AlR^3-O-)_m$ for oligomeric, cyclic aluminoxanes; wherein n is 1-40, preferably n is 10-30; m is 3-40, preferably m is 3-30 and $R^3$ is a $C_1$ to $C_8$ alkyl group and preferably a methyl group. Further other organoaluminum compounds can be used such as trimethylaluminum, triethylaluminium, triisopropylaluminum, tri-n-propylaluminum, triisobutylaluminum, tri-n-butylaluminum, triamylaluminium; dimethylaluminium ethoxide, diethylaluminium ethoxide, diisopropylaluminium ethoxide, di-n-propylaluminium ethoxide, diisobutylaluminium ethoxide and di-n-butylaluminium ethoxide; dimethylaluminium hydride, diethylaluminium hydride, diisopropylaluminium hydride, di-n-propylaluminium hydride, diisobutylaluminium hydride and di-n-butylaluminium hydride.

Suitable boron-containing cocatalysts include trialkylboranes, for example trimethylborane or triethylborane and/or perfluoroarylborane and/or perfluoroarylborate-compounds.

In the process to produce olefin polymers by polymerizing one or more olefins in the presence of a metallocene complex preferably an organoaluminum cocatalyst is present.

More preferably, methylaluminoxane, trialkylboranes, perfluoroarylboranes or perfluoroarylborates are used as the cocatalyst.

Olefin Polymerization

In another aspect, the invention relates to a process for the preparation of olefin polymers by polymerizing one or more olefins in the presence of a cocatalyst and the metallocene complex of the invention, wherein the metallocene complex optionally is immobilized on a support.

The process to produce the olefin polymers may start with the reaction of the metallocene complex according to the invention with the cocatalyst. This reaction can be performed in the same vessel as the reaction vessel wherein the olefin polymers are produced or in a separate vessel, whereafter the mixture of the metallocene complex and the cocatalyst is fed to the reaction vessel. During the reaction described above an inert solvent can be used.

The polymerization, can be adequately carried out in a slurry process, a solution process or a gasphase process.

In the mixture of the metallocene complex and an organoaluminium cocatalyst, the cocatalyst is used in an amount of 10 to 100,000 mol, preferably from 10 to 10,000 mol per mol of the transition metal compound.

In the mixture of the metallocene complex and an organoborane or organoborate cocatalyst, the cocatalyst is used in an amount of 0.1 to 100 mol, preferably from 0.5 to 100 mol per mol of the transition metal compound.

The solvent used in a slurry process to produce olefin polymers may be any organic solvent usually used for the polymerization. Examples of solvents are benzene, toluene, xylene, propane, butane, pentane, hexane, heptane, cyclohexane and methylene chloride. Also the olefin to be polymerized can be used as the solvent.

In the process to produce olefin polymers the polymerization conditions, like for example temperature, time, pressure, monomer concentration can be chosen within wide limits. The polymerization temperature is in the range from −100 to 300° C., preferably 0 to 200° C., more preferably 50 to 200° C. The polymerization time is in the range of from 10 seconds to 20 hours, preferably from 1 minute to 10 hours, more preferably from 5 minutes to 5 hours. The ethylene pressure during polymerization is in the range from 1 to 3500 bar, preferably from 1 to 2500 bar, more preferably from 1 to 1000 bar, even more preferably from 1 to 500 bar, most preferably from 1 to 100 bar. The molecular weight of the polymer can be controlled by use of hydrogen in the polymerization. The polymerization may be conducted by a batch process, a semi-continuous process or a continuous process and may also be conducted in two or more steps of different polymerization conditions. The polyolefin produced is separated from the polymerization solvent and dried by methods known to a person skilled in the art.

In the process to produce olefin polymers the olefin which is polymerized can be one type of olefin or can be mixtures of different olefins. The polymerization thus includes homopolymerization and copolymerization. Examples of olefins are α-olefins such as ethylene, propylene, 1-butene, 1-pentene, 4-methyl-1-pentene, 1-hexene, 1-octene, 1-nonene, 1-decene; conjugated and non-conjugated dienes such as butadiene, 1,4-hexadiene, 5-ethylidene-2-norbornene, dicyclopentadiene, 4-methyl-1,4-hexadiene and 7-methyl-1,6-octadiene; cyclic olefins such as cyclobutene and other olefinic compounds such as isobutene, vinyl-cyclohexane and styrene but is not limited thereto.

Preferably, at least one of the olefins that is polymerized is ethylene. More preferably, a mixture of ethylene and at least one other α-olefin of 3 or more carbon atoms is polymerized.

Preferably, the other olefin of 3 or more carbon atoms is chosen from 1-butene, 1-hexene, 1-octene, vinyl-cyclohexane or 4-methyl-1-pentene.

Preferably, the olefin comonomer is present in an amount of about 5 to about 50 percent by weight of the ethylene-olefin copolymer, more preferably an amount of from about 7 to about 40 percent by weight of the ethylene α-olefin copolymer.

For example a linear low density polyethylene (LLDPE) having a melt mass flow rate (also known as melt flow index) as determined using ASTM D1238-10 (190° C./2.16 kg) which ranges from 0.5 to 125 g/10 min and a density in the range from 900 kg/m$^3$ to less than 940 kg/m$^3$ as determined using ASTM D1505-10 may be obtained. For example, the density of the LLDPE ranges from about 915 kg/m$^3$ to less than 940 kg/m$^3$, for example between 915 and 925 kg/m$^3$. For example, the melt flow index of the LLDPE ranges from 0.3 to 3 g/10 min, for example from 0.5 to 1.5 g/10 min.

The polymerisation may be performed via a gas phase process, via a slurry process or via a solution process. The production processes of polyethylene are summarised in "Handbook of Polyethylene" by Andrew Peacock (2000; Dekker; ISBN 0824795466) at pages 43-66.

The various processes may be divided into solution polymerisation processes employing homogeneous (soluble) catalysts and processes employing supported (heterogeneous) catalysts. The latter processes include both slurry and gas phase processes.

When carrying out a slurry or gasphase process, a so-called continuity agent or anti-static agent or anti-fouling agent may be added to reactor.

The invention is also directed to a polyolefin, for example polyethylene, preferably high density polyethylene (HDPE) obtainable or obtained by the process of the invention, for example by copolymerizing ethylene and at least one other olefin in the presence of a metallocene complex according to the invention or a composition, wherein the metallocene complex according to the invention is immobilized on a support.

As defined herein, in linear low density polyethylene, the term "linear" means that the polymer is substantially linear, but may contain some long chain branching.

"Long chain branching" (LCB) means a chain length longer than the short chain branch that results from the incorporation of the α-olefin(s) into the polymer backbone. Each long chain branch will have the same comonomer distribution as the polymer backbones and can be as long as the polymer backbone to which it is attached.

As a practical matter, current $^{13}$C nuclear magnetic resonance spectroscopy cannot distinguish the length of a long chain branch in excess of six carbon atoms. However, there are other known techniques useful for determining the presence of long chain branches in ethylene polymers. Two such methods are gel permeation chromatography coupled with a low angle laser light scattering detector (GPC-LALLS) and gel permeation chromatography coupled with a differential viscometer detector (GPC-DV). In addition, melt-rheology, for example determining the behavior of the polymer melt under different shear rates, is frequently used to indicate the presence of long chain branching. The use of these techniques for long chain branch detection and the underlying theories have been well documented in the literature.

See, for example, Zimm, G. H. and Stockmayer, W. H., J. Chem. Phys., 17, 1301 (1949) and Rudin, A., Modern Methods of Polymer Characterization, John Wiley & Sons, New York (1991 pp. 103-112).

It has been found that with the metallocene complex of the invention or with the composition of the invention wherein the metallocene complex of the invention is present on a support, it is possible to produce polyethylene from ethylene and at least one other olefin, for example an olefin having up to 8 carbon atoms, with a high incorporation of the at least one other olefin.

The amount of incorporation of the at least one other olefin, for example an α-olefin in the polyethylene is expressed by the amount of branches per 1000 carbon atoms.

The presence of short chain branching of up to 6 carbon atoms in length can be determined in ethylene polymers by using $^{13}$C nuclear magnetic resonance (NMR) spectroscopy and is quantified using the method described by Randall (Rev. Macromol. Chem. Phys., C.29, V. 2 & 3, p. 285-297).

Therefore, the invention also relates to a polyolefin, preferably polyethylene, for example linear low density polyethylene (LLDPE). The low density polyethylene, for example LLDPE, preferably has an amount of branches per 1000 carbon atoms as determined using $^{13}$C NMR of at least 18, for example of at least 19, for example at least 20 and/or for example at most 30, for example at most 25, for example at most 23, for example at most 21

The number average molecular weight (Mn) of the polyolefin, for example polyethylene, for example LLDPE of the invention may vary between wide ranges and may for example be in the range from 1000 to 200000 Da.

For example, the Mn of the polyolefin of the invention may be at least 1500, for example at least 2000, for example at least 20,000, for example at least 50,000 and/or for example at most 150,000, for example at most 110,000, for example at most 100,000, for example at most 70,000 Da.

The weight average molecular weight (Mw) of the polyolefin, for example polyethylene, for example LLDPE of the invention may also vary between wide ranges and may for example be in the range from 1500 to 500000. For example, the Mw of the polyolefin of the invention may be at least 2500, for example at least 10,000, for example at least 50,000, for example at least 100,000 and/or for example at most 400,000, for example at least 350,000, for example at most 300,000, for example at most 250,000.

For purpose of the invention, the Mw and Mn are determined using SEC (Size Exclusion Chromatography) using 1,2,4-trichlorobenzene or o-dichlorobenzene as an eluent, and calibrated using linear polyethylene or polystyrene standards.

The molecular weight distribution (that is Mw/Mn) of the polyolefin of the invention may for example vary from 2 to 5, from 2.1 to 4 or from 2.5 to 3.5.

The polyolefin obtained or obtainable by the process of the invention may be mixed with suitable additives.

Examples of suitable additives for polyethylene include but are not limited to the additives usually used for polyethylene, for example antioxidants, nucleating agents, acid scavengers, processing aids, lubricants, surfactants, blowing agents, ultraviolet light absorbers, quenchers, antistatic agents, slip agents, anti-blocking agents, antifogging agents, pigments, dyes and fillers, and cure agents such as peroxides. The additives may be present in the typically effective amounts well known in the art, such as 0.001 weight % to 10 weight % based on the total composition.

The polyolefins of the invention and compositions comprising said polyolefins may suitably be used for the manufacture of articles. For example, the polyolefins and compositions of the invention may be manufactured into film, for example by compounding, extrusion, film blowing or casting or other methods of film formation to achieve, for example uniaxial or biaxial orientation. Examples of films include blown or cast films formed by coextrusion (to form multilayer films) or by lamination and may be useful as films for packaging, for example as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets.

Therefore, in another aspect, the invention also relates to articles comprising the polyolefins obtainable by the process of the invention.

In yet another aspect, the invention also relates to use of the polyolefins obtainable by the process of the invention for the preparation of articles, for example for the preparation of films.

In yet another aspect, the invention relates to a process for the preparation of articles using the polyolefin according to the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will hereafter be elucidated by way of the following examples, without being limited thereto.

EXAMPLES

General Considerations

All manipulations were carried out under an atmosphere of dry, $O_2$-free $N_2$ employing an Innovative Technology glove box and a Schlenk vacuum-line. Tetrahydrofuran (THF), toluene, methylene chloride, hexane and pentane were purified with a Grubbs-type column system manufactured by Innovative Technology and dispensed into thick-walled Schlenk glass flasks equipped with Teflon-valve stopcocks. Pyridine was dried over the appropriate agents and distilled into the same kind of storage flasks. Anhydrous benzene (Alfa, 99.8%, packaged under argon) was purchased and used as received. Deuterated solvents were dried over the appropriate agents, vacuum-transferred into storage flasks with Teflon stopcocks and degassed accordingly ($CDCl_3$, $C_6D_6$ and $CD_2Cl_2$). $^1H$, $^{11}B$, $^{13}C$ and $^{31}P$ NMR spectra were recorded at 25° C. Bruker 400 MHz spectrometers. Chemical shifts are given relative to $SiMe_4$ and referenced to the residue solvent signal ($^1H$, $^{13}C$). $^{11}B$ and $^{31}P$ resonances were referenced externally to ($BF_3.Et_2O$) and 85% $H_3PO_4$, respectively. Chemical shifts are reported in ppm and coupling constants as scalar values in Hz. $ZrCl_4(Me_2S)_2$, $^1TiCl_4(THF)_2$[2] and $TiCl_4(Me_2S)_2$[3] were prepared as reported in, respectively, Sassmannshausen, J. *Organometallics* 2000, 19, 482-489; Seenivasan, K.; Sommazzi, A.; Bonino, F.; Bordiga, S.; Groppo, E. *Chemistry—a European Journal* 2011, 17, 8648-8656 and Suren Lewkebandara, T.; McKarns, P. J.; Haggerty, B. S.; Yap, G. P. A.; Rheingold, A. L.; Winter, C. H. *Polyhedron* 1998, 17, 1-9. $ZrCl_4(THF)_2$ (Strem) was purchased and used as received.

Synthesis of Ligands and Catalyst Precursors.

General Procedure 1. Silylene-Bridged Ligands n-Butyllitium in hexanes (1 equiv) was added dropwise to a solution of the respective indene (1 equiv) in anhydrous ether at room temperature, and the formed mixture was stirred overnight. Then, chlorodimethyl(2,3,4,5,-tetramethylcyclopenta-2,4-dienyl)silane (1 equiv) was added at −80° C., the obtained mixture was allowed to warm slowly to room temperature and stirred overnight. The mixture was poured into water, the organic layer was separated, and the aqueous layer was extracted with ether. The combined organic phases were dried over anhydrous sodium sulfate and then evaporated to dryness. The residue was purified by flash chromatography on silica gel 60 (40-64 μm) using hexane-dichloromethane mixture (10:1, vol.) as an eluent.

General Procedure 2. Silylene-Bridged Ligands n-Butyllitium in hexanes (1 equiv) was added dropwise to a solution of the respective indene (1 equiv) in anhydrous ether at room temperature, and the formed mixture was stirred overnight. CuCN (0.4 equiv) was added at −25° C. After complete dissolution of the copper reagent, chlorodimethyl(2,3,4,5,-tetramethylcyclopenta-2,4-dienyl)silane (1 equiv) was added at the same temperature and the obtained mixture was allowed to warm slowly to room temperature and stirred overnight. The resulting mixture was poured into water, the organic layer was separated, and the aqueous layer was extracted with ether. The combined organic phases were dried over anhydrous sodium sulfate and then evaporated to dryness. The residue was purified by flash chromatography on silica gel 60 (40-64 μm) using hexane-dichloromethane mixture (10:1, vol.) as an eluent.

General Procedure 3. Complexes n-Butyllithium in hexanes (2 equiv) was added dropwise to a solution of the respective ligand (1 equiv) in ether at room temperature and the formed mixture was stirred overnight. Then, $ZrCl_4$ (1 equiv) was added at −80° C., and the obtained mixture was allowed to warm slowly to room temperature and stirred overnight. The resulting mixture was evaporated to dryness, toluene was added to the residue, and the resulting suspension was filtered through a pad of Celite 503 (hot filtration may be necessary in case of a low soluble product). The filtrate was evaporated until the precipitation started. Crystals precipitated from this solution overnight at room temperature were collected, washed with a small amount of cold toluene, and then dried in vacuum.

Dimethyl(2-phenyl-1H-inden-1-yl)(2,3,4,5,-tetramethylcyclopenta-2,4-dienyl)silane (L126)

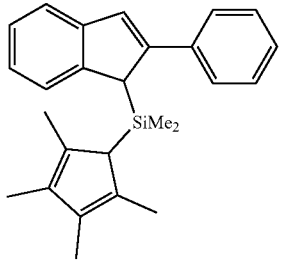

According to the General procedure 1, 0.57 g (20%) of the title compound (yellowish oil) were obtained from 1.50 g (7.80 mmol) of 2-phenyl-1H-indene in 40 ml of ether, 3.20 ml (7.80 mmol, 2.5 M) of n-butyllithium, and 1.68 g (7.80 mmol) of chlorodimethyl(2,3,4,5,-tetramethylcyclopenta-2,4-dienyl)silane.

$^1$H NMR (400 MHz, CDCl$_3$): δ 7.54 (d, 1H, J=7.5 Hz), 7.49 (t, 3H, J=7.2 Hz), 7.37 (t, 2H, J=7.7 Hz), 7.26 (m, 2H), 7.19 (td, 1H, J=7.4 Hz, J=1.1 Hz), 7.08 (s, 1H), 4.37 (s, 1H), 3.00 (br.s, 1H), 2.02 (s, 3H), 1.89 (s, 3H), 1.84 (s, 3H), 1.81 (s, 3H), −0.54 (s, 3H), −0.64 (s, 3H).

Dimethyl(2-methyl-4-phenyl-1H-inden-1-yl)(2,3,4,5,-tetramethylcyclopenta-2,4-dienyl)silane (L141)

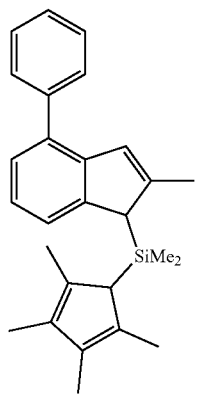

According to the General procedure 2, 2.50 g (54%) of the title compound (yellowish oil) were obtained from 2.50 g (12.0 mmol) of 2-methyl-4-phenyl-1H-indene in 60 ml of ether, 4.90 ml (12.0 mmol, 2.5 M) of n-butyllithium, 0.43 g (5.00 mmol) of CuCN and 2.57 g (12.0 mmol) of chlorodimethyl(2,3,4,5,-tetramethylcyclopenta-2,4-dienyl)silane.

$^1$H NMR (400 MHz, CDCl$_3$): δ 7.54 (m, 2H), 7.45 (t, 2H, J=7.6 Hz), 7.39 (d, 1H, J=7.6 Hz), 7.34 (m, 1H), 7.24 (d, 1H, J=6.5 Hz), 7.16 (t, 1H, J=7.5 Hz), 6.76 (m, 1H), 3.71 (s, 1H), 3.26 (br. s, 1H), 2.23 (s, 3H), 2.03 (s, 3H), 1.99 (s, 3H), 1.86 (s, 3H), 1.85 (s, 3H), −0.25 (s, 3H), −0.28 (s, 3H).

Dimethyl(3-phenyl-1H-inden-1-yl)(2,3,4,5,-tetramethylcyclopenta-2,4-dienyl)silane (L142)

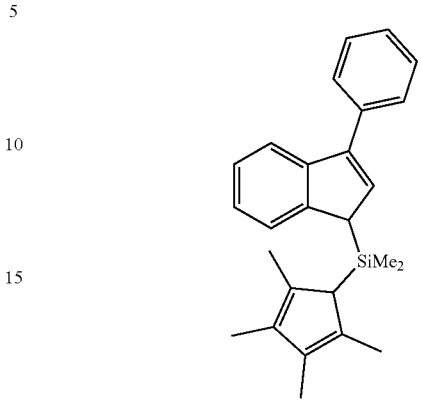

According to the General procedure 2, 2.74 g (48%) of the title compound (yellowish oil) were obtained from 3.00 g (15.6 mmol) of 3-phenyl-1H-indene in 50 ml of ether, 6.30 ml (15.6 mmol, 2.5 M) of n-butyllithium, 0.56 g (6.20 mmol) of CuCN and 3.40 g (15.6 mmol) of chlorodimethyl(2,3,4,5,-tetramethylcyclopenta-2,4-dienyl)silane.

$^1$H NMR (600 MHz, CDCl$_3$): δ 7.67 (d, 1H, J=7.7 Hz), 7.61 (d, 2H, J=7.4 Hz), 7.49 (d, 1H, J=7.8 Hz), 7.47 (t, 2H, J=7.7 Hz), 7.37 (t, 1H, J=7.4 Hz), 7.30 (t, 1H, J=7.5 Hz), 7.24 (t, 1H, J=7.4 Hz), 6.60 (d, 1H, J=1.9 Hz), 3.75 (s, 1H), 3.10 (br.s, 1H), 2.07 (s, 3H), 2.04 (s, 3H), 1.89 (s, 3H), 1.88 (s, 3H), −0.06 (s, 3H), −0.39 (s, 3H).

(2-Isopropyl-1H-inden-1-yl)dimethyl(2,3,4,5,-tetramethylcyclopenta-2,4-dienyl)silane (L143)

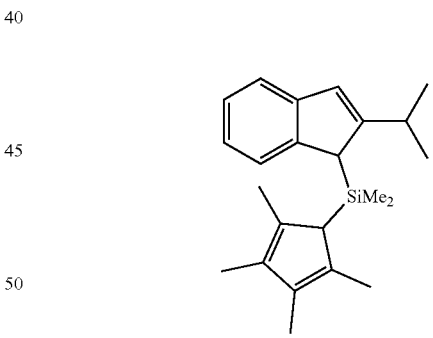

According to the General procedure 2, 1.74 g (60%) of the title compound (yellowish oil) were obtained from 1.38 g (8.70 mmol) of 2-isopropyl-1H-indene in 50 ml of ether, 3.50 ml (8.70 mmol, 2.5 M) of n-butyllithium, 0.30 g (3.48 mmol) of CuCN and 1.90 g (8.70 mmol) of chlorodimethyl(2,3,4,5,-tetramethylcyclopenta-2,4-dienyl)silane.

$^1$H NMR (600 MHz, CDCl$_3$): δ 7.43 (d, 1H, J=7.5 Hz), 7.34 (d, 1H, J=7.5 Hz), 7.20 (t, 1H, J=7.4 Hz), 7.08 (t, 1H, J=7.9 Hz), 6.59 (s, 1H), 3.76 (s, 1H), 3.20 (s, 1H), 2.72-2.79 (m, 1H), 2.05 (s, 3H), 1.93 (s, 3H), 1.85 (s, 3H), 1.83 (s, 3H), 1.32 (d, 3H, J=6.7 Hz), 1.13 (d, 3H, J=6.9 Hz), −0.26 (s, 3H), −0.36 (s, 3H).

(1H-inden-2-yl)dimethyl(2,3,4,5-tetramethylcyclopenta-2,4-dienyl)silane (L151)

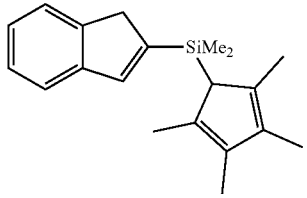

t-Butyllithium (48.5 ml, 93.0 mmol, 3 equiv) was added dropwise to a solution of 2-bromoindene (6.00 g, 31.0 mmol, 1 equiv) in 200 ml of anhydrous ether at −80° C. The resulting mixture was allowed to warm to −20° C. and a solution of CuCN (0.27 g, 3.10 mmol, 0.1 equiv) and LiCl (0.26 g, 6.20 mmol, 0.2 equiv) in 20 ml of THF was added dropwise. After complete dissolution of solids chlorodimethyl(2,3,4,5,-tetramethylcyclopenta-2,4-dienyl)silane (6.60 g, 31.0 mmol, 1 equiv) was added in one portion and the reaction mixture was slowly warmed to warm temperature and stirred overnight. The resulting mixture was poured into water, the organic layer was separated, and the aqueous layer was extracted with ether. The combined organic phase was dried over anhydrous sodium sulfate and then evaporated to dryness. The residue was purified by preparative HPLC (Waters 2525 pump; Waters 996 PDA detector (UV-Vis); column: Phenomenex Lina C18(2) 50×250 mm, 10 um; eluent: MeCN, 100 ml/min) to afford 2.30 g (28%) of the title product as a yellow oil.

$^1$H NMR (400 MHz, CDCl$_3$): δ 7.61 (d, 1H, J=7.3 Hz), 7.53 (d, 1H, J=7.4 Hz), 7.40 (t, 1H, J=7.4 Hz), 7.32 (td, 1H, J=7.4 Hz, J=1.0 Hz), 7.21 (s, 1H), 3.54 (s, 2H), 3.17 (br.s, 1H), 2.01 (s, 6H), 1.94 (s, 6H), 0.31 (s, 6H).

Dimethyl(1-methyl-2-phenyl-1H-inden-3-yl)(2,3,4,5-tetramethylcyclopenta-2,4-dienyl)silane (L152)

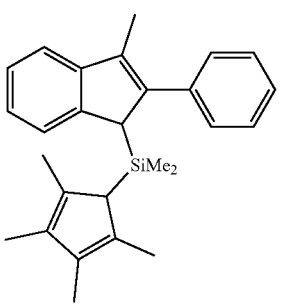

According to the General procedure 2, 4.18 g (66%) of the title compound (yellowish oil) were obtained from 3.40 g (16.5 mmol) of 1-methyl-2-phenyl-1H-indene in 100 ml of ether, 6.70 ml (16.50 mmol, 2.5 M) of n-butyllithium, 0.36 g (6.60 mmol) of CuCN and 3.50 g (16.50 mmol) of chlorodimethyl(2,3,4,5,-tetramethylcyclopenta-2,4-dienyl)silane.

$^1$H NMR (400 MHz, CDCl$_3$): δ 7.54 (d, 1H, J=7.5 Hz), 7.47 (d, 1H, J=7.7 Hz), 7.38-7.44 (m, 4H), 7.34 (t, 1H, J=7.5 Hz), 7.26-7.31 (m, 1H), 7.23 (td, 1H, J=7.4 Hz, J=1.1 Hz), 4.29 (s, 1H), 2.73 (br.s, 1H), 2.28 (d, 3H, J=1.9 Hz), 1.91 (s, 6H), 1.80 (s, 3H), 1.79 (s, 3H), −0.50 (s, 3H), −0.73 (s, 3H).

Cat 126

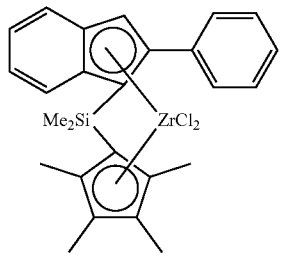

According to the General procedure 3, 0.08 g (15%) of the title compound (yellow crystals) were obtained from 0.57 g (1.50 mmol) of L126 in 50 ml of ether, 1.25 ml (3.00 mmol, 2.5 M) of n-butyllithium, and 0.36 g (1.50 mmol) of ZrCl$_4$ after additional recrystallization from methylcyclohexane.

$^1$H NMR (600 MHz, CDCl$_3$): δ 7.68-7.70 (m, 4H), 7.33-7.36 (m, 3H), 7.29-7.32 (m, 1H), 7.17 (s, 1H), 6.99-7.02 (m, 1H), 1.93 (s, 3H), 1.92 (s, 3H), 1.90 (s, 3H), 1.28 (s, 3H), 1.24 (s, 3H), 0.77 (s, 3H).

Cat 141

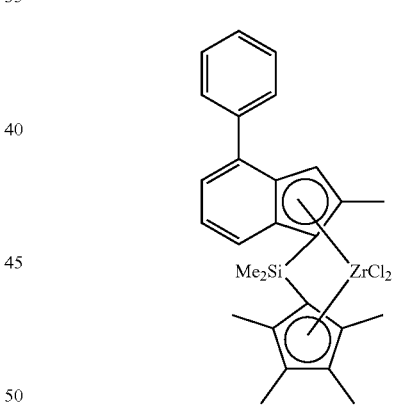

According to the General procedure 3, 1.07 g (30%) of the title compound (yellow crystals) were obtained from 2.50 g (6.50 mmol) of L141 in 60 ml of ether, 5.20 ml (13.0 mmol, 2.5 M) of n-butyllithium, and 1.51 g (6.50 mmol) of ZrCl$_4$. The product contained 0.5 equiv of cocrystallized toluene.

$^1$H NMR (600 MHz, CDCl$_3$): δ 7.67 (d, 2H, J=7.4 Hz), 7.56 (d, 1H, J=8.6 Hz), 7.45 (t, 2H, J=7.5 Hz), 7.36 (t, 1H, J=7.24 Hz), 7.30 (d, 1H, J=7.0 Hz), 7.14-7.26 (m, 5H in toluene), 7.06 (t, 1H, J=7.9 Hz), 7.03 (s, 1H), 2.35 (s, 3H in toluene), 2.28 (s, 3H), 2.08 (s, 3H), 2.00 (s, 3H), 1.92 (s, 3H), 1.90 (s, 3H), 1.21 (s, 3H), 1.10 (s, 3H).

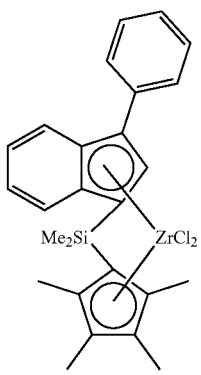

Cat 142

According to the General procedure 3, 0.73 g (20%) of the title compound (yellow crystals) were obtained from 2.74 g (7.40 mmol) of L142 in 60 ml of ether, 6.00 ml (14.8 mmol, 2.5 M) of n-butyllithium, and 1.72 g (7.40 mmol) of ZrCl$_4$ after additional recrystallization from toluene.

$^1$H NMR (600 MHz, CDCl$_3$): δ 7.93 (d, 1H, J=8.8 Hz), 7.60 (d, 2H, J=7.8 Hz), 7.57 (d, 1H, J=8.7 Hz), 7.47 (t, 2H, J=7.7 Hz), 7.39-7.41 (m, 1H), 7.34 (t, 1H, J=7.4 Hz), 7.08-7.11 (m, 1H), 5.95 (s, 1H), 2.00 (s, 3H), 1.97 (s, 3H), 1.94 (s, 3H), 1.88 (s, 3H), 1.22 (s, 3H), 0.98 (s, 3H).

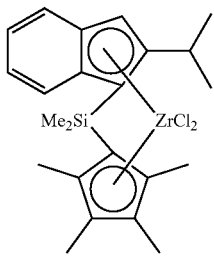

Cat 143

According to the General procedure 3, 1.50 g (58%) of the title compound (yellow crystals) were obtained from 1.74 g (5.20 mmol) of L143 in 50 ml of ether, 4.20 ml (10.4 mmol, 2.5 M) of n-butyllithium, and 1.20 g (5.20 mmol) of ZrCl$_4$ after additional recrystallization from toluene.

$^1$H NMR (600 MHz, CDCl$_3$): δ 7.61 (d, 1H, J=8.5 Hz), 7.58 (d, 1H, J=8.7 Hz), 7.31 (m, 1H), 7.05 (s, 1H), 6.96 (m, 1H), 3.02 (sept, 1H, J=6.7 Hz), 1.99 (s, 3H), 1.97 (s, 3H), 1.87 (br.s, 6H), 1.38 (d, 3H, J=6.6 Hz), 1.20 (s, 3H), 1.16 (d, 3H, J=6.7 Hz), 1.10 (s, 3H).

According to the General procedure 3, 0.34 g (19%) of the title compound (yellow crystals) were obtained from 1.20 g (4.00 mmol) of L151 in 50 ml of ether, 3.30 ml (8.00 mmol, 2.5 M) of n-butyllithium, and 0.95 g (4.00 mmol) of ZrCl$_4$ after additional recrystallization from toluene.

$^1$H NMR (400 MHz, CDCl$_3$): δ 7.60-7.66 (m, 2H), 7.28-7.33 (m, 2H), 5.94 (s, 2H), 2.04 (s, 6H), 1.99 (s, 6H), 0.91 (s, 6H).

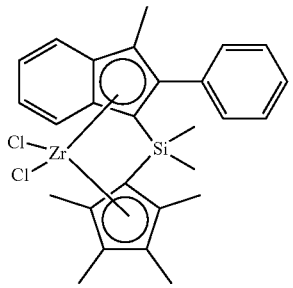

Cat 152

According to the General procedure 3, 1.53 g (27%) of the title compound (yellow crystals) were obtained from 4.10 g (10.0 mmol) of L152 in 150 ml of ether, 8.70 ml (20.0 mmol, 2.5 M) of n-butyllithium, and 2.50 g (10.0 mmol) of ZrCl$_4$ after additional recrystallization from toluene.

$^1$H NMR (400 MHz, CDCl$_3$): δ 7.66 (d, 1H, J=8.8 Hz), 7.56 (d, 1H, J=8.8 Hz), 7.19-7.39 (m, 6H), 6.98-7.01 (m, 1H), 2.37 (s, 3H), 2.01 (s, 3H), 1.93 (s, 3H), 1.92 (s, 3H), 1.34 (s, 3H), 1.23 (s, 3H), 0.50 (s, 3H).

Polymerizations

The reactivity of a catalyst towards the comonomer 1-hexene is expressed as the mol percentage of hexene incorporated in the copolymer per volume percentage of hexene loading in the reactor-cells of the PPR. A high ratio of incorporated hexene:loaded hexene indicates a high reactivity of the catalyst towards comonomer, which is advantageous for commercial applications and also indicates that this catalyst is more prone to generate long-chain-branched polymers through re-insertion of vinyl terminated polymer chains. The value presented is the averaged value from the experiments with different hexene loadings to the reactor.

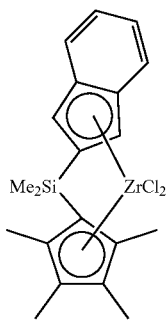

Cat 151

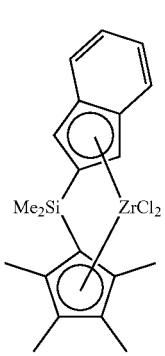

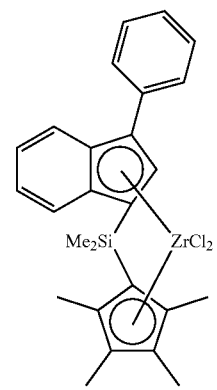

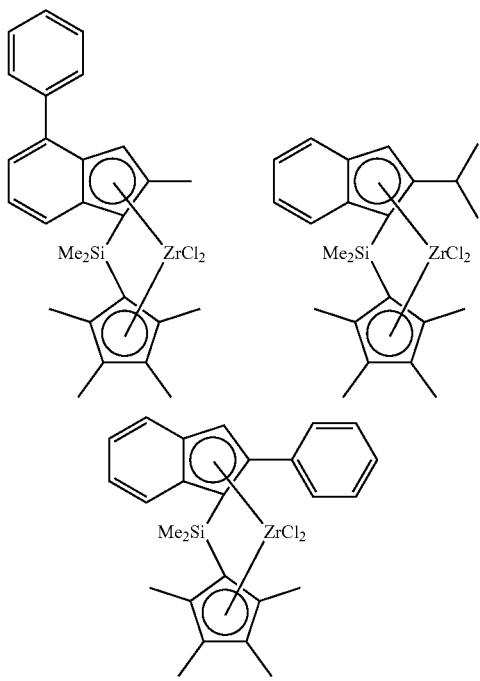

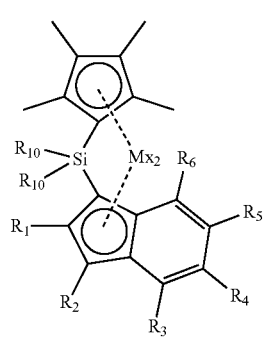

| CAT ID# | C6 loading [vol %] | Rp [kg mmol$_{cat}^{-1}$ [C$_2$H$_4$]$^{-1}$h$^{-1}$] | Mw [KDa] | MWD [-] | C6 inc. [mol %] | C6 reactivity [mol %/vol %] |
|---|---|---|---|---|---|---|
| 151 comparative | 0 | 410 | — | — | — | 0.2 |
| | 5 | 590 | 44 | 2,1 | 0,9 | |
| | 20 | 700 | 42 | 2,1 | 2,7 | |
| 142 Comparative | 0 | 645 | — | — | — | 0.8 |
| | 2 | 1197 | 50 | 2,2 | 1,8 | |
| | 10 | 167 | 51 | 2,3 | 7,7 | |
| 141 comparative | 0 | 384 | — | — | — | 2.3 |
| | 1 | 577 | 118 | 2,2 | 2,3 | |
| 143 | 0 | 611 | — | — | — | 2.3 |
| | 1 | 459 | 324 | 2,2 | 2,5 | |
| | 2 | 455 | 243 | 2,2 | 4,1 | |
| 126 | 0 | 282 | — | — | — | 2.3 |
| | 1 | 211 | 403 | 2,6 | 2,3 | |
| | 2 | 260 | 269 | 2,5 | 4,8 | |

Catalyst 142 has been described in WO2014/099307. The molecular weight obtained in ethylene-hexene copolymerizations is only modest. Catalyst 141 has been described in WO2015/065681. Although this catalyst displays high comonomer reactivity, the molecular weight of the copolymer needs further improvement. Inventive catalysts 143 and 126 result in high molecular weight copolymers and high comonomer reactivity.

The invention claimed is:

1. Metallocene complex according to formula I,

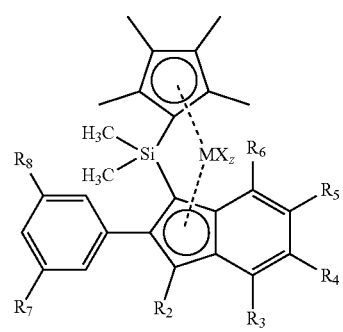

wherein R1 is isopropyl, wherein R2 and R3 are each independently is-selected from H, methyl, ethyl, n-propyl, iso-propyl, n-butyl, t-butyl, or cyclohexyl, and wherein R4, R5 and R6 are independently selected from H, methyl, ethyl, n-propyl, iso-propyl, n-butyl, t-butyl, cyclohexyl, benzyl, phenyl, 3,5-dimethyl-1-phenyl, 3,5-diethyl-1-phenyl, 3,5-diisopropyl-1-phenyl, or 3,5-ditertiairbutyl-1-phenyl, and wherein R4 and R5, or R5 and R6 are optionally connected to form a ring structure, wherein each R10 is a C1-C4 alkyl group, wherein M is selected from Ti, Zr and Hf, X is an anionic ligand to M.

2. A metallocene complex according to formula (II):

wherein R2 is selected from H and C1-C10 alkyl groups, R3 is H or C1-C10 alkyl, and R3, R4, R5 and R6 are independently selected from H, C1-C10 alkyl, and C6-C20 aryl, and wherein R4 and R5, or R5 and R6 are optionally connected to form a ring structure, M is Ti, Zr, or Hf, X is an anionic ligand to M, z is the number of X groups and equals the valence of M minus 2, and wherein R7 and R8 are C1-C10 alkyl groups.

3. A metallocene complex according to formula (III)

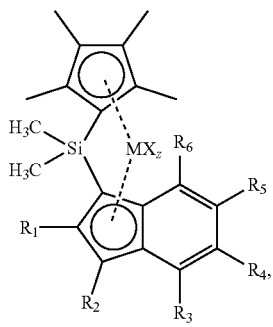

wherein R1 is isopropyl, R2 is H, R3 is H, R4-R6 are chosen from H, a methyl group, or a phenyl group, M is Ti, Zr, or Hf, X is an anionic ligand to M, and z is the number of X groups and equals the valence of M minus 2.

4. A catalyst comprising the metallocene complex according to claim 3 and a cocatalyst.

5. The catalyst according to claim 4, wherein the cocatalyst includes aluminium- or boron-containing cocatalysts.

6. A process for the preparation of olefin polymers, the method comprising polymerizing one or more olefins in the presence of a cocatalyst and the metallocene complex according to claim 3, wherein the metallocene complex optionally is immobilized on a support.

7. The process according to claim 6, wherein a mixture of ethylene and at least one other α-olefin of 3 or more carbon atoms is polymerized.

8. The metallocene complex according to claim 1, wherein each R10 is a methyl group.

9. The metallocene complex according to claim 3, wherein M is zirconium.

10. The metallocene complex according to claim 3, wherein X is a methyl group or Cl.

11. The metallocene complex according to claim 3, wherein R4-R6 are H.

12. The metallocene complex according to claim 11, wherein M is zirconium.

13. The metallocene complex according to claim 11, wherein X is a methyl group or Cl.

14. The metallocene complex according to claim 3, wherein M is zirconium or hafnium.

15. The metallocene complex according to claim 3, wherein X is a methyl group, Cl, Br or I.

* * * * *